(12) United States Patent
Khedira et al.

(10) Patent No.: US 6,578,922 B2
(45) Date of Patent: Jun. 17, 2003

(54) FIXING DEVICE FOR A REMOVABLE ARMREST, AND A SEAT DEVICE INCLUDING SUCH A FIXING DEVICE

(75) Inventors: Maher Khedira, Le Chesnay (FR); Stéphane Peculier, Montlhery (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 0 days.

(21) Appl. No.: 10/058,611

(22) Filed: Jan. 28, 2002

(65) Prior Publication Data

US 2002/0105217 A1 Aug. 8, 2002

(30) Foreign Application Priority Data

Feb. 6, 2001 (FR) .............................................. 01 01590

(51) Int. Cl.[7] .................................................. A47C 7/54
(52) U.S. Cl. ............................. 297/411.32; 297/411.38; 297/411.3; 297/115
(58) Field of Search ............................... 297/115, 411.3, 297/411.35, 411.38, 366, 367, 411.32

(56) References Cited

U.S. PATENT DOCUMENTS

| 3,397,912 | A | * | 8/1968 | Bush | ..................... 297/354.12 |
| 4,040,665 | A | | 8/1977 | Wallace et al. | |
| 5,395,160 | A | * | 3/1995 | Krebs et al. | ............. 297/411.2 |
| 5,524,970 | A | * | 6/1996 | Kienke et al. | ............... 297/362 |
| 5,984,416 | A | * | 11/1999 | Waldo et al. | ........... 297/411.38 |
| 6,209,960 | B1 | * | 4/2001 | Bradbury | ................ 297/411.35 |
| 6,257,668 | B1 | * | 7/2001 | Chou et al. | ............. 297/411.32 |
| 6,382,726 | B2 | * | 5/2002 | Bullesbach et al. | ..... 297/411.38 |
| 6,447,069 | B1 | * | 9/2002 | Terris et al. | ........... 297/411.29 |

FOREIGN PATENT DOCUMENTS

| FR | 2 789 142 A1 | 8/2000 |
| WO | WO 97/46416 | 12/1997 |

\* cited by examiner

Primary Examiner—Peter M. Cuomo
Assistant Examiner—Erika Garrett
(74) Attorney, Agent, or Firm—Marshall, Gerstein & Borun

(57) ABSTRACT

A fixing device for a removable armrest, the device comprising a cylindrical support shaft having a projecting locking member and a housing with a plastics material ring adapted to receive the support shaft engaged therein as a bayonet mount. A metal reinforcing strength member surrounds the plastics material ring and co-operates angularly with the locking member of the support shaft by coming into abutment therewith to prevent relative pivoting between the support shaft and the housing.

10 Claims, 4 Drawing Sheets

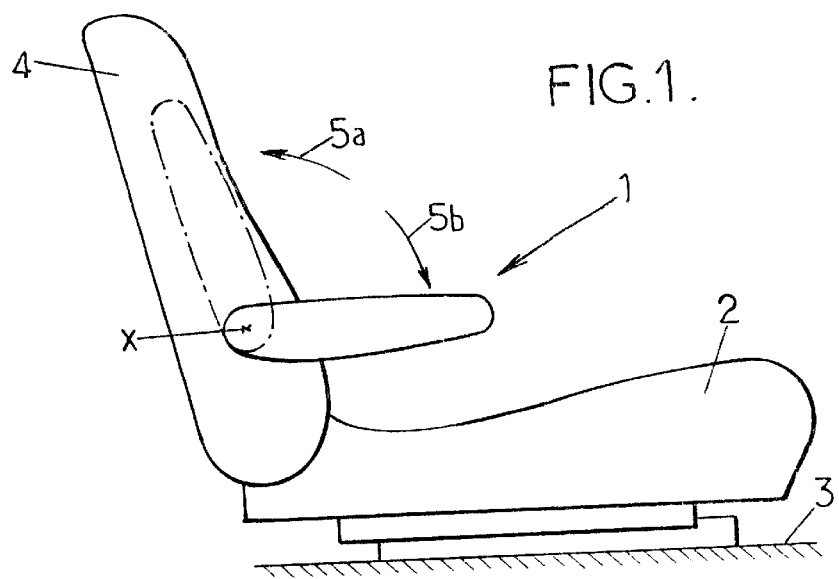
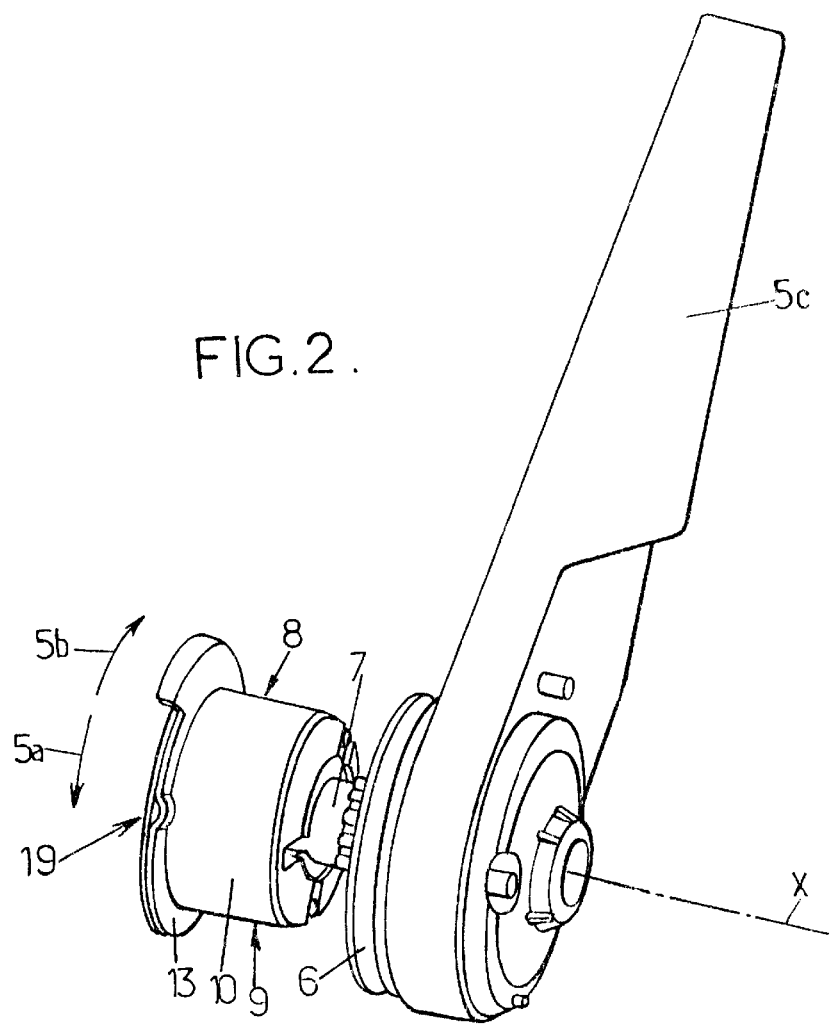

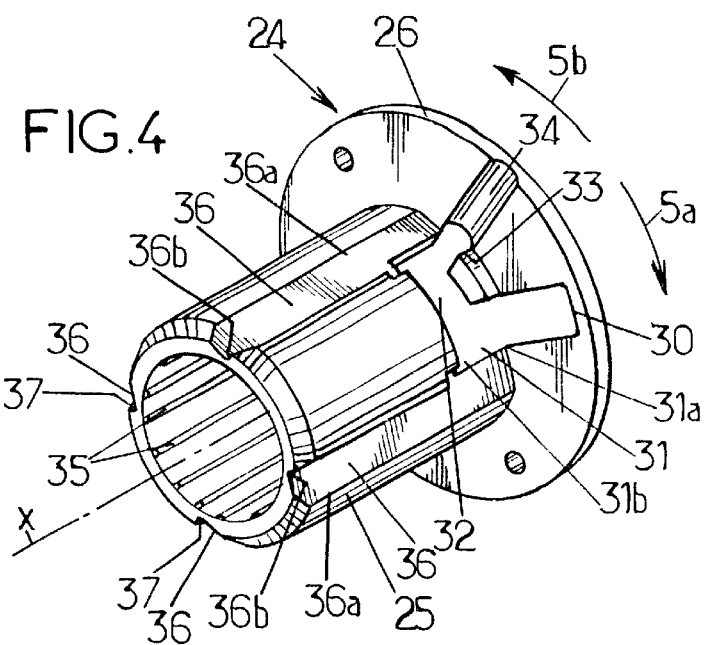
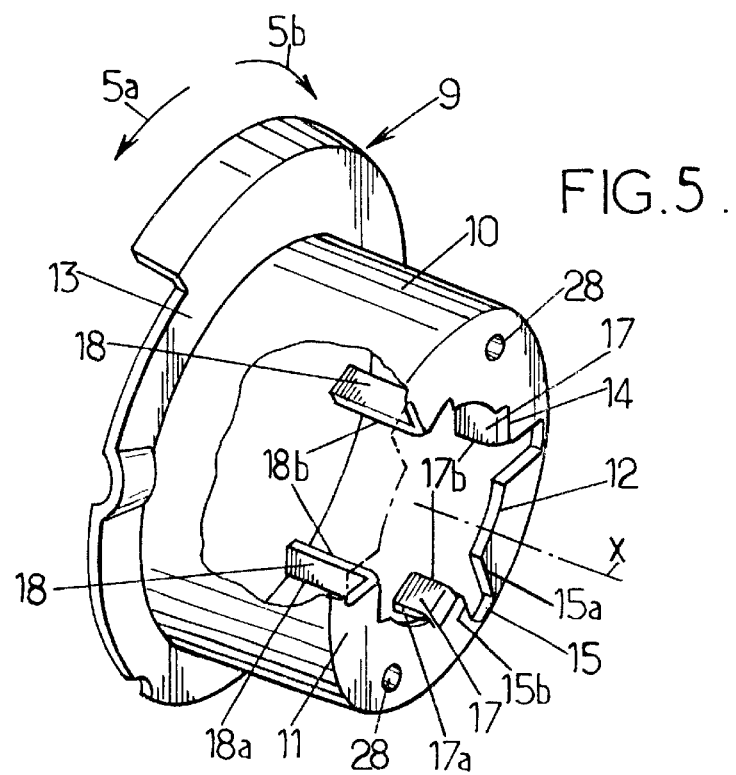

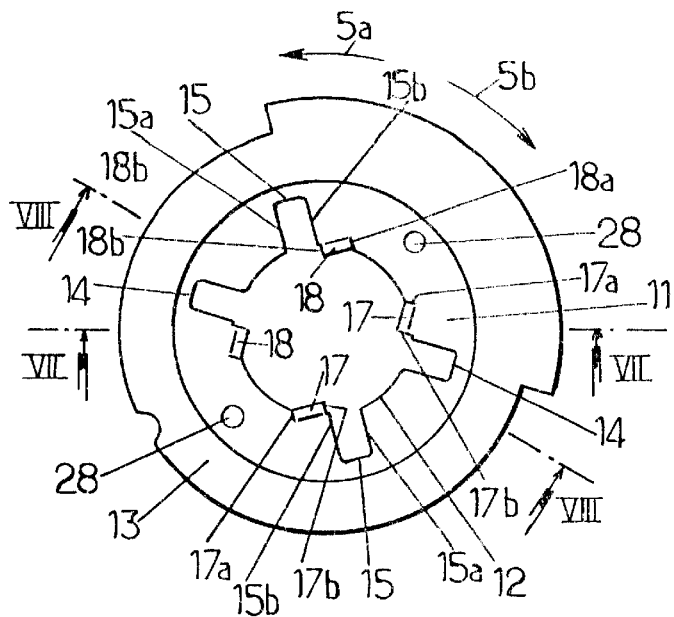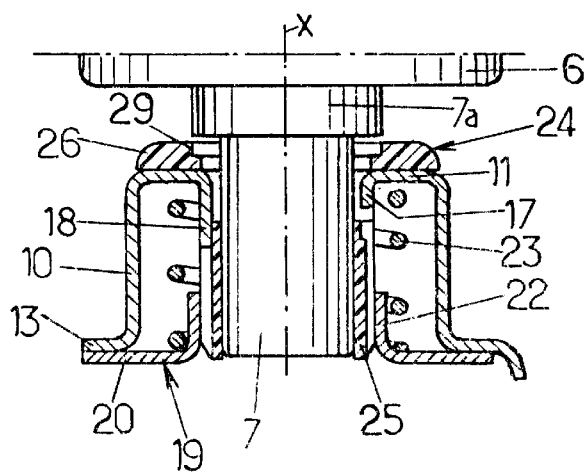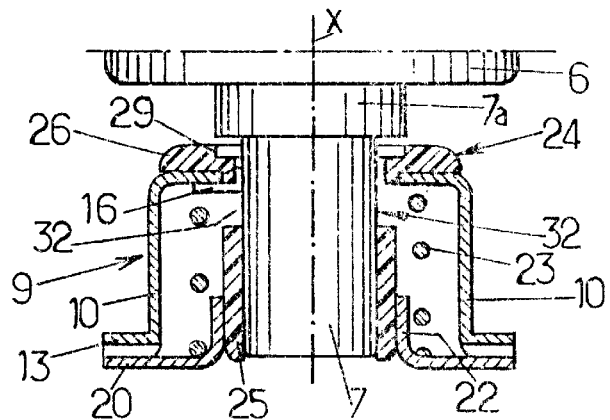

FIXING DEVICE FOR A REMOVABLE ARMREST, AND A SEAT DEVICE INCLUDING SUCH A FIXING DEVICE

FIELD OF THE INVENTION

The present invention relates to fixing devices for removable armrests, and to seat devices including such fixing devices.

More particularly, the invention provides a fixing device for a removable armrest, the device comprising a rigid cylindrical support shaft and a rigid housing, one for fixing to an armrest and the other to a seat, at least one locking member projecting laterally from said support shaft, the housing extending for a certain distance along a central axis and comprising:

- a plastics material ring having a cylindrical tubular duct extending along the central axis between a rear end and a front end which is open and adapted to receive the support shaft, enabling said support shaft to turn about the central axis while said support shaft is being mounted, the plastics material ring also comprising a rearwardly-open locking recess adapted to receive the locking member of the support shaft and to co-operate by abutment with said locking member to prevent relative pivoting between the support shaft and the housing once said support shaft is mounted in said housing;
- a metal reinforcing strength member surrounding the plastics material ring in contact with the tubular duct of said plastics material ring; and
- a return spring adapted to urge the support shaft forwards when said support shaft is received in the tubular duct.

BACKGROUND OF THE INVENTION

Document FR-A-2 789 142 describes an example of such a fixing device, in which the locking housing is completely defined by the ring of plastics material. That fixing device gives entire satisfaction, but it nevertheless suffers from the drawback that the central ring of plastics material runs the risk of being severely stressed in use, which can degrade said central ring if a large pivot torque is applied between the support shaft and the housing. Furthermore, the support shaft is supported by ribs on the plastics material ring over a small fraction of its length, thereby also limiting the mechanical strength of the armrest mount.

The present invention seeks in particular to mitigate that drawback.

To this end, the invention provides a fixing device of the kind in question:

- wherein the tubular duct of the plastics material ring is adapted to co-operate by receiving the support shaft without clearance over a major portion of the length of the housing, said tubular duct having at least one axial slot which extends between an open front end opening out in the front end of said tubular duct and a closed rear end, and the tubular duct of the plastics material ring further having at least one circumferential slot which extends between a first end communicating with the rear end of the axial slot and a second end communicating with the locking recess, said axial and circumferential slots being adapted to receive the locking member of the support shaft when the support shaft is mounted in the housing; and
- wherein the metal strength member is adapted to co-operate with said locking member of the support shaft by coming into abutment therewith when said locking member is to be found in the locking recess of the housing so as to prevent relative pivoting between the support shaft and the housing about the central axis.

By means of these dispositions, the support shaft is well supported by the tubular duct of the plastics material ring, which duct is itself reinforced by the metal strength member. In addition, said metal strength member takes up the pivot torque between the support shaft and the housing when said support shaft is mounted on the housing, such that the pivot torque applies hardly any stress to the plastics material ring.

In preferred embodiments of the invention, one or more of the following dispositions can optionally be used:

- the metal strength member of the housing has an annular side wall surrounding the tubular duct, and an annular front wall extending radially inwards from said side wall at the front end of the tubular duct, said front wall including at least a first notch in correspondence with said at least one axial slot of the plastics material ring to allow the locking member of the support shaft to pass through, and said front wall being extended axially rearwards by folded reinforcing tabs bearing radially against the tubular duct, at least one of the tabs co-operating with said locking member of the support shaft by coming into abutment therewith when said locking member is in the locking recess of the housing so as then to prevent relative pivoting between the support shaft and the housing about the central axis in at least one angular direction;
- the reinforcing tabs are engaged in axial longitudinal grooves formed on the outside of the tubular duct in correspondence with said reinforcing tabs in such a manner as to prevent relative pivoting between the plastics material ring and the metal strength member;
- each of the reinforcing tabs has first and second longitudinal edges parallel to the central axis, at least a first one of said reinforcing tabs extending so as to slope circumferentially and radially towards the inside in a first angular direction from its first longitudinal edge to its second longitudinal edge, the first longitudinal edge of said first reinforcing tab co-operating with an edge defined by the corresponding axial groove of the tubular duct by coming into abutment therewith to prevent the plastics material ring from pivoting relative to the metal strength member in a second angular direction opposite to the first angular direction, and at least a second one of said reinforcing tabs extending circumferentially and radially inwards in said second angular direction from its first longitudinal edge to its second longitudinal edge, the second longitudinal edge of said second reinforcing tab co-operating with an edge defined by the corresponding axial groove of the tubular duct by coming into abutment therewith to prevent the plastics material ring from pivoting relative to the metal strength member in said first angular direction;
- the plastics material ring has a flange extending radially towards the front end of the tubular duct, said flange including at least one notch in correspondence with the first notch of the front wall of the metal strength member to receive said at least one locking member while the support shaft is being mounted in the housing;
- the locking recess is defined by a cutout formed in the tubular duct of the plastics material ring and extending axially forwards from the second end of the circumferential slot to the flange of said plastics material ring, the front wall of the metal strength member having at least one second notch facing said cutout to receive the locking member of the support shaft when said support shaft is mounted in the housing, the second notch having two substantially radial edges adapted to co-operate angularly with the locking member by coming into abutment therewith to prevent relative pivoting between the support shaft and the housing;

the flange of the plastics material ring includes a radial groove that is closed forwardly and open rearwardly, facing the second notch of the metal strength member, the locking member of the support shaft being adapted to engage in part in said radial groove when said support shaft is mounted in the housing;

the metal strength member has an annular end wall which is secured to the side wall of said metal strength member and which extends radially inwards from said side wall to a cylindrical collar bearing radially against the rear end of the tubular duct; and the return spring is disposed around the tubular duct of the plastics material ring to bear against the end wall of the metal strength member, said return spring being a helical compression spring adapted to urge the locking member forwards.

Furthermore, the invention also provides a seat device comprising a seat and a removable armrest adapted to be mounted on the seat by means of a fixing device as defined above, the housing being secured to a first element selected from the seat and the removable armrest, and the support shaft being secured to a second element selected from the removable armrest and the seat.

BRIEF DESCRIPTION OF THE DRAWINGS

Other characteristics and advantages of the invention appear from the following description of an embodiment thereof, given by way of non-limiting example and with reference to the accompanying drawings.

In the drawings:

FIG. 1 is a diagrammatic view of a seat provided with a removable armrest mounted using a fixing device constituting an embodiment of the invention;

FIG. 2 is a perspective view showing the armrest fixing device of FIG. 1;

FIG. 4 is a perspective view of a collar of plastics material belonging to the fixing device of FIGS. 2 and 3;

FIG. 5 is a cutaway perspective view of the metal strength member of the fixing device of FIGS. 2 and 3;

FIG. 6 is a face view of the metal strength member of FIG. 5 seen looking along arrow VI of FIG. 3; and FIGS. 7 and 8 are section views respectively on lines VII—VII and VIII—VIII showing the fixing device in the mounted configuration.

MORE DETAILED DESCRIPTION

Figure 3:
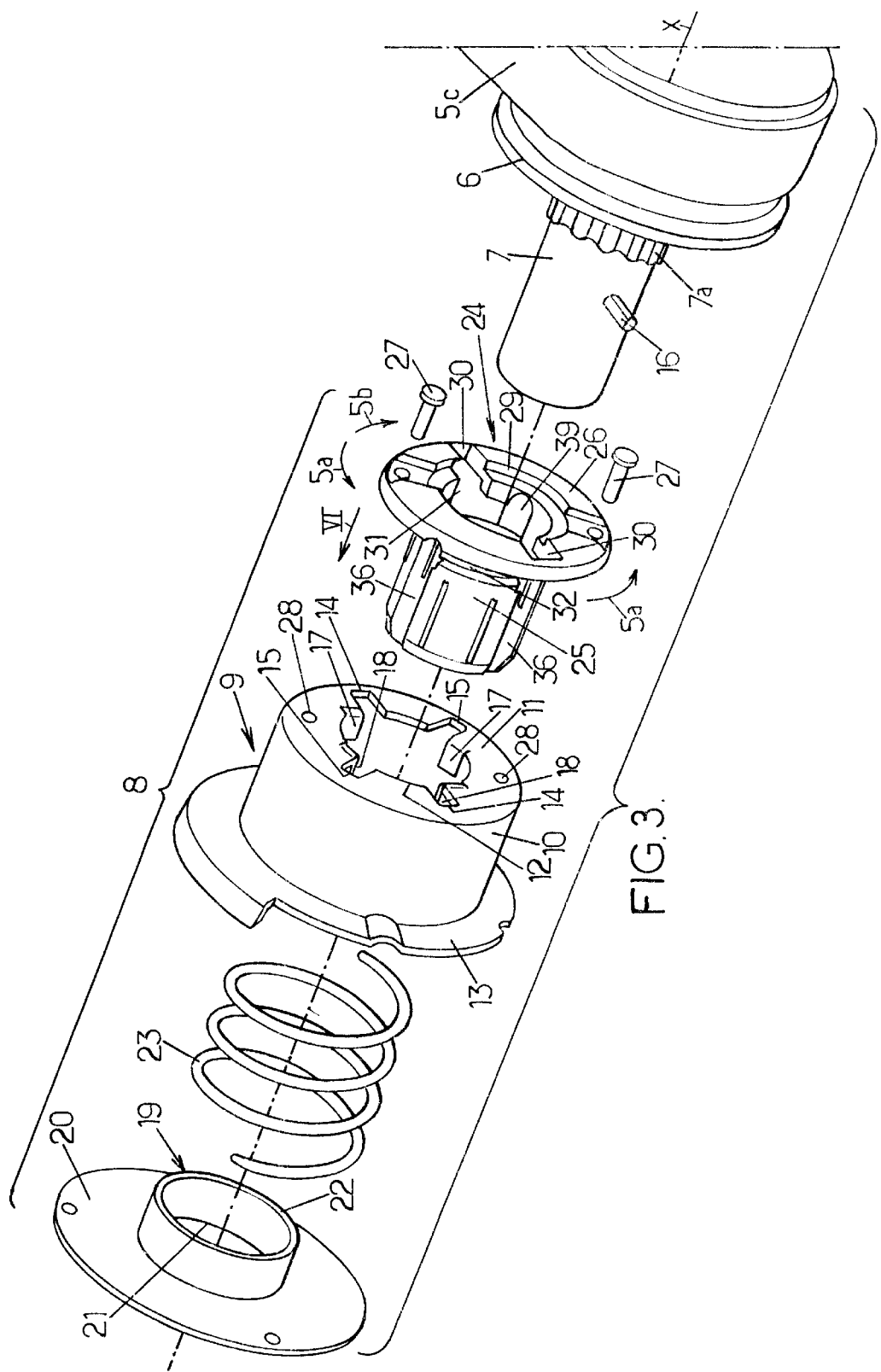
FIG. 3 is an exploded perspective view of the FIG. 2 fixing device.

In the various figures, the same references designate elements that are identical or similar.

FIG. 1 shows a motor vehicle seat 1 comprising a seat proper 2 mounted on the floor 3 of the vehicle, and a seat back 4 carried by the seat proper.

On at least one of its sides, the back 4 has a removable armrest 5 mounted to pivot about a transverse horizontal axis of rotation X between a folded-down position of use (shown in continuous lines in FIG. 1) and a folded-up position (shown in chain-dotted lines in FIG. 1) where the armrest is retracted against the side of the seat back 4.

As shown in FIGS. 2 and 3, the rigid strength member 5c of the armrest, e.g. made of a plastics material or of metal, is connected via an adjustment mechanism 6 to a cylindrical support shaft 7, e.g. made of metal, which extends along the axis of rotation X and which is removably mounted in a fixed housing 8 secured to the back 4.

The hinge mechanism 6 can be of the type described in above-mentioned document FR-A-2 789 142, for example, or it can be of the type described in document FR-A-2 686 383: in either case, the armrest 5 can pivot freely towards its raised position in the direction 5a, but remains locked in position in the direction 5b when the user applies an elbow thereto, the armrest 5 also being capable of pivoting freely towards its lowered position from its raised position.

Nevertheless, it should be observed that the invention is not limited to this type of hinge mechanism 6. In particular, the invention can be used with a hinge mechanism 6 that serves solely to provide free pivoting in both directions between the raised and lowered positions. Similarly, the invention can be used with a support shaft 7 that is secured directly to the strength member 5c of the armrest, without interposing a hinge mechanism 6 between the support shaft 7 and the strength member 5c of the armrest.

As can be seen in detail in FIG. 3, the fixed housing 8 comprises a rigid metal strength member 9 which itself has a circularly cylindrical side wall 10 centered on the axis of rotation X.

The cylindrical wall 10 extends along the axis X between:

a front end close to the armrest 5 and extended radially inwards by a front wall 11 formed integrally with said side wall 10, the front wall 11 being pierced by a circular central hole 12 centered on the axis X; and a rear end remote from the armrest 5 which is extended radially outwards by an outwardly-directed flange 13, itself formed integrally with the side wall 10.

Two diametrically opposite first notches 14 are formed in the front wall 11 of the rigid metal strength member 9, the notches extending radially outwards from the central hole 12, and two likewise diametrically opposite second notches 15 are also formed therein and are offset by about 30° relative to the first notches 14.

The first and second notches 14 and 15 are adapted to pass two locking members 16, e.g. constituted by two diametrically opposite locking pins (formed where appropriate by the two ends of a single rigid metal rod passing through the shaft 7) projecting radially from opposite sides of the support shaft 7 of the armrest, with only one of these locking pins being visible in FIG. 3.

Furthermore, the front wall 11 of the rigid metal strength member 9 is also formed integrally with four tabs 17, 18 folded parallel to the axis X towards the inside of the housing.

The rigid metal strength member 9 also has a rigid metal end wall 19 comprising a radial wall 20 fixed to the outwardly-directed flange 13, in particular by welding, said radial wall 20 being pierced by a central hole 21 and being extended axially forwards from said central hole by a circularly cylindrical collar 22 centered on the axis X.

Furthermore, the housing 8 contains a helical compression spring 23 which is placed inside the side wall 10 and which bears against the end wall 19 and against the front wall 11 of the metal strength member 9, the helical spring surrounding the cylindrical collar 22 of the end wall 19 and the folded-in tabs 17 and 18 of the front wall 11.

Finally, the housing 8 also has a ring 24 of plastics material provided with a tubular duct 25 which is substantially circularly cylindrical and centered on the axis X, the tubular duct 25 being received without clearance in the central hole 12 of the front wall of the metal strength member.

The tubular duct 25 extends parallel to the axis X between a rear end and a front end which is extended radially outwards by a flange 26 formed integrally with said tubular duct, the flange 26 covering the front wall 11 of the metal strength member 9 and being fixed to said front wall by rivets 27 or other fastening members passing through said flange 26 and penetrating into orifices 28 formed in the front wall 11.

As can be seen in FIGS. 3 and 4, the flange 26 of the ring of plastics material has a circular recess 29 which receives a shoulder 7a of the shaft 7 while the shaft 7 and the housing 8 are being assembled together, and said flange 26 also has two diametrically opposite notches 30 on either side of the axis X and opening out radially towards the inside of the tubular duct 25.

The two notches 30 in the ring 24 of plastics material are disposed so as to correspond with the notches 14 of the metal strength member 9 in such a manner as to enable the pins 16 secured to the support shaft 7 to pass through said notches 30 and 14 simultaneously when said support shaft is engaged in the tubular duct 25.

In addition, each notch 30 communicates with an axial slot 31 formed in the tubular duct 25, said axial slot 31 extending parallel to the axis X between a first end 31a opening out forwards in the notch 30 and a rear end 31b which is closed axially in a rearward direction.

The rear end 31b communicates with a radial slot 32 extending circumferentially in angular direction 5b in a radial plane between:

a first end communicating with the rear end 31b of the axial slot 31; and a second end communicating with a cutout 33 formed in the tubular duct 25 and extending axially forwards from said second end of the radial slot 32, the cutout 33 thus forming a locking housing that is forwardly open and rearwardly closed by the flange 26 of the plastics material ring.

Advantageously, the rear face of the flange 26 of the plastics material ring can also include, in register with each cutout 33 in the tubular duct 25, a radial groove 34 which is disposed to correspond with one of the notches 15 of the metal strength member 9, each of the grooves 34 and the corresponding notch 15 receiving one of the pins 16 of the support shaft 7 when said support shaft is mounted in the housing 8.

Furthermore, the cylindrical inside surface of the tubular duct 25 advantageously includes narrow axial ribs 35 which bear without clearance against the circularly cylindrical outer surface of the support shaft 7, thus limiting friction between the support shaft 7 and the plastics material ring 24 while said support shaft is being assembled in the housing 8.

Finally, the outer surface of the ring 24 of plastics material includes four axial grooves 36 which are disposed in pairs on either side of each circumferential slot 32, each of the grooves 36 being of radial depth that increases from a first longitudinal edge 36a relatively far from the circumferential slot 32 and disposed at the cylindrical outer surface of the tubular duct 25, to a second longitudinal edge 36b situated close to the corresponding circumferential slot 32.

As can be seen in FIGS. 5 and 6, the folded tabs 17 and 18 of the metal strength member 9 which are engaged in the grooves 36 are organized as one pair of relatively long folded tabs 18 which are disposed on either side of one of the circumferential slots 32 of the plastics material ring 24, and another pair of relatively short folded tabs 17 which are disposed on either side of the other circumferential slot 32 of said plastics material ring 24.

Each of the folded tabs 17, 18 slopes radially inwards between a first longitudinal edge 17a, 18a situated to correspond with the longitudinal edge 36a of the corresponding groove 36, and a second longitudinal edge 17b, 18b closer to the axis X than the first edge 17a, 18a, with at least the second longitudinal edge 17b, 18b pressing radially against the duct 25 and coming into abutment with the second longitudinal edge 36b of the corresponding groove 36 so as to prevent the plastics material ring 24 from turning relative to the metal strength member 9.

The above-described device operates as follows.

When the user of the seat 1 seeks to fit the removable armrest 5 to the side of the seat, the support shaft 7 of the armrest is inserted into the tubular duct 25 of the plastics material ring from the front end of said tubular duct, so that the support shaft 7 is received without clearance in said tubular duct.

During this movement, the locking pins 16 of the support shaft 7 engage in the notches 30 of the plastics material ring, and simultaneously in the first notches 14 in the metal strength member, after which said pins 16 penetrate into the axial slots 31 of the plastics material ring until they reach the rear ends of said slots. During this movement, the locking pins 16 are guided not only by the axial slots 31 of the plastics material ring, but also by the edges 17b, 18b of the folded metal tabs 17 and 18 which are respectively adjacent to the two first notches 14 of the metal strength member.

Furthermore, during this movement, the pins 16 come to bear against the front end of the helical spring 23, thereby compressing the spring.

When the pins 16 come close to the rear end 31b of the axial slots 31 of the plastics material ring, the user causes the support shaft 7 to pivot in the direction 5b so that said pins 16 travel along the circumferential slots 32 all the way to the second ends of said circumferential slots, after which the spring 23 pushes the locking pins 16 back into the cutouts 33 of the plastics material ring, until they come into the radial grooves 34 formed in the rear face of the flange 26 of said plastics material ring.

The support shaft 7 of the armrest is thus securely fixed to the seat back since, as can be seen in FIGS. 7 and 8, the support shaft 7 of the armrest is engaged without clearance over the major part of its length inside the tubular duct 25 of the plastics material ring, which tubular duct is securely supported:

at its rear end by the cylindrical collar 22 of the metal strength member in which it is received without clearance; and at its front end by the tabs 17 and 18 of the metal strength member each of which comes into contact with the tubular duct 25 via its respective longitudinal edge 17b, 18b.

Furthermore, the support shaft 7 is prevented very strongly from turning about the axis X, since not only are the locking pins 16 engaged in the cutouts 33 of the plastics material ring 24, but they also co-operate by coming into abutment with the metal strength member 9 in both angular directions:

in angular direction 5b, each locking pin 16 comes into abutment with the radial edge 15b of the corresponding second notch 15 of the metal strength member and also with the longitudinal edge 17b, 18b of the corresponding folded tab (see FIGS. 5 and 6); while in the opposite direction 5a corresponding to the armrest being raised, where force levels are generally lower, each locking pin 16 comes into abutment with the other edge 15a of the corresponding second notch 15.

What is claimed is:

1. A fixing device for a removable armrest, the device comprising a rigid cylindrical support shaft and a rigid housing, are for fixing to an armrest and the other to a seat, at least one locking member projecting laterally from said support shaft, the housing extending for a certain distance along a central axis and comprising:

a plastics material ring having a cylindrical tubular duct extending along the central axis between a rear end and a front end which is open and adapted to receive the support shaft, enabling said support shaft to turn about the central axis while said support shaft is being mounted, the plastics material ring also comprising a rearwardly-open locking recess adapted to receive the locking member of the support shaft and to co-operate by abutment with said locking member to prevent relative pivoting between the support shaft and the housing once said support shaft is mounted in said housing;

a metal reinforcing strength member surrounding the plastics material ring in contact with the tubular duct of said plastics material ring; and a return spring adapted to urge the support shaft forwards when said support shaft is received in the tubular duct;

wherein the tubular duct of the plastics material ring is adapted to co-operate by receiving the support shaft without clearance over a major portion of the length of the housing, said tubular duct having at least one axial slot which extends between an open front end opening out in the front end of said tubular duct and a closed rear end, and the tubular duct of the plastics material ring further having at least one circumferential slot which extends between a first end communicating with the rear end of the axial slot and a second end communicating with the locking recess, said axial and circumferential slots being adapted to receive the locking member of the support shaft when the support shaft is mounted in the housing; and wherein the metal strength member is adapted to co-operate with said locking member of the support shaft by coming into abutment therewith when said locking member is to be found in the locking recess of the housing so as to prevent relative pivoting between the support shaft and the housing about the central axis.

2. A device according to claim 1, in which the metal strength member of the housing has an annular side wall surrounding the tubular duct, and an annular front wall extending radially inwards from said side wall at the front end of the tubular duct, said front wall including at least a first notch in correspondence with said at least one axial slot of the plastics material ring to allow the locking member of the support shaft to pass through, and said front wall being extended axially rearwards by folded reinforcing tabs bearing radially against the tubular duct, at least one of the tabs co-operating with said locking member of the support shaft by coming into abutment therewith when said locking member is in the locking recess of the housing so as then to prevent relative pivoting between the support shaft and the housing about the central axis in at least one angular direction.

3. A device according to claim 2, in which the reinforcing tabs are engaged in axial longitudinal grooves formed on the outside of the tubular duct in correspondence with said reinforcing tabs in such a manner as to prevent relative pivoting between the plastics material ring and the metal strength member.

4. A device according to claim 3, in which each of the reinforcing tabs has first and second longitudinal edges parallel to the central axis, at least a first one of said reinforcing tabs extending so as to slope circumferentially and radially towards the inside in a first angular direction from its first longitudinal edge to its second longitudinal edge, the first longitudinal edge of said first reinforcing tab co-operating with an edge defined by the corresponding axial groove of the tubular duct by coming into abutment therewith to prevent the plastics material ring from pivoting relative to the metal strength member in a second angular direction opposite to the first angular direction, and at least a second one of said reinforcing tabs extending circumferentially and radially inwards in said second angular direction from its first longitudinal edge to its second longitudinal edge, the second longitudinal edge of said second reinforcing tab co-operating with an edge defined by the corresponding axial groove of the tubular duct by coming into abutment therewith to prevent the plastics material ring from pivoting relative to the metal strength member in said first angular direction.

5. A device according to claim 2, in which the plastics material ring has a flange extending radially towards from the front end of the tubular duct, said flange including at least one notch in correspondence with the first notch of the front wall of the metal strength member to receive said at least one locking member while the support shaft is being mounted in the housing.

6. A device according to claim 5, in which the locking recess is defined by a cutout formed in the tubular duct of the plastics material ring and extending axially forwards from the second end of the circumferential slot to the flange of said plastics material ring, the front wall of the metal strength member having at least one second notch facing said cutout to receive the locking member of the support shaft when said support shaft is mounted in the housing, the second notch having two substantially radial edges adapted to co-operate angularly with the locking member by coming into abutment therewith to prevent relative pivoting between the support shaft and the housing.

7. A device according to claim 6, in which the flange of the plastics material ring includes a radial groove that is closed forwardly and open rearwardly, facing the second notch of the metal strength member, the locking member of the support shaft being adapted to engage in part in said radial groove when said support shaft is mounted in the housing.

8. A device according to claim 1, in which the metal strength member has an annular end wall which is secured to the side wall of said metal strength member and which extends radially inwards from said side wall to a cylindrical collar bearing radially against the rear end of the tubular duct.

9. A device according to claim 8, in which the return spring is disposed around the tubular duct of the plastics material ring to bear against the end wall of the metal strength member, said return spring being a helical compression spring adapted to urge the locking member forwards.

10. A seat device comprising a seat and a removable armrest adapted to be mounted on the seat by means of a fixing device according to claim 1, the housing being secured to a first element selected from the seat and the removable armrest, and the support shaft being secured to a second element selected from the removable armrest and the seat.

* * * * *